VARIABLE FREQUENCY PULSE GENERATOR

Original Filed April 23, 1958 3 Sheets-Sheet 1

INVENTORS
KENTON J. JONES
GLENWOOD GREWELL
BY Wade Koontz
ATTORNEY
James S. Shannon
AGENT July 31, 1962 G. GREWELL ET AL 3,047,774

VARIABLE FREQUENCY PULSE GENERATOR

Original Filed April 23, 1958 3 Sheets-Sheet 2

INVENTORS
KENTON J. JONES
GLENWOOD GREWELL
BY Wade Koontz
ATTORNEY
James S. Shannon
AGENT

VARIABLE FREQUENCY PULSE GENERATOR

Original Filed April 23, 1958 3 Sheets-Sheet 3

INVENTORS
KENTON J. JONES
GLENWOOD GREWELL
BY Wade Koontz
ATTORNEY
James S. Shannon
AGENT

United States Patent Office 3,047,774

Patented July 31, 1962

3,047,774

VARIABLE FREQUENCY PULSE GENERATOR

Glenwood Grewell, Enon, and Kenton J. Jones, Dayton, Ohio, assignors to the United States of America as represented by the Secretary of the Air Force

Original application Apr. 23, 1958, Ser. No. 730,504, now Patent No. 2,980,771, dated Apr. 18, 1961. Divided and this application Nov. 7, 1960, Ser. No. 67,865
2 Claims. (Cl. 315—207)
(Granted under Title 35, U.S. Code (1952), sec. 266)

The invention described herein may be manufactured and used by or for the United States Government for governmental purposes without payment to us of any royalty thereon.

This application is a division of our application Serial No. 730,504, filed April 23, 1958, now U.S. Patent No. 2,980,771, granted April 18, 1961.

The purpose of this invention is to provide means for generating a continuous series of relatively high voltage fixed amplitude pulses of variable repetition rate from a source of relatively low voltage direct current, using simple non-electronic elements. The apparatus is intended primarily for the periodic energization of a gaseous discharge light source used to place equal time interval markings on photographic film, but is suited as well to other applications where a variable frequency series of pulses is required. The device is particularly suited to use with the low voltage direct current power supply of an aircraft in connection with flight test instruments, etc.

Briefly the pulse generator comprises a rotary contactor, driven at constant speed and operating on the vernier principle, in conjunction with a switching arrangement to provide a series of variable frequency low voltage pulses from a low voltage direct current source. These pulses are applied to the primary of a step-up transformer having its secondary tuned to a frequency considerably higher than the highest pulse frequency. A unidirectional diode and a gaseous discharge device are connected in parallel across the terminals of the secondary winding. The steep leading edge of each voltage pulse produces a sharp rise in secondary volatge to the point at which the gaseous discharge device is fired, the diode being poled to be nonconductive to this initial rise in secondary voltage. Further firings of the discharge device are prevented by the diode which is conductive on the next half cycle of the oscillations induced in the tuned secondary and quickly damps them below the firing level. The process is repeated when the leading edge of the next low voltage pulse arrives at the transformer primary so that a series of sharp pulses clipped at the firing voltage of the gaseous discharge tube appears across its terminals. The light produced by the discharge device may be used to mark equal time intervals on photographic film as previously mentioned.

A more detailed description of the invention will be given with reference to the accompanying drawings in which:

FIGS. 1*a* and 1*b* are views of the vernier contactor, and

Figure 1B:
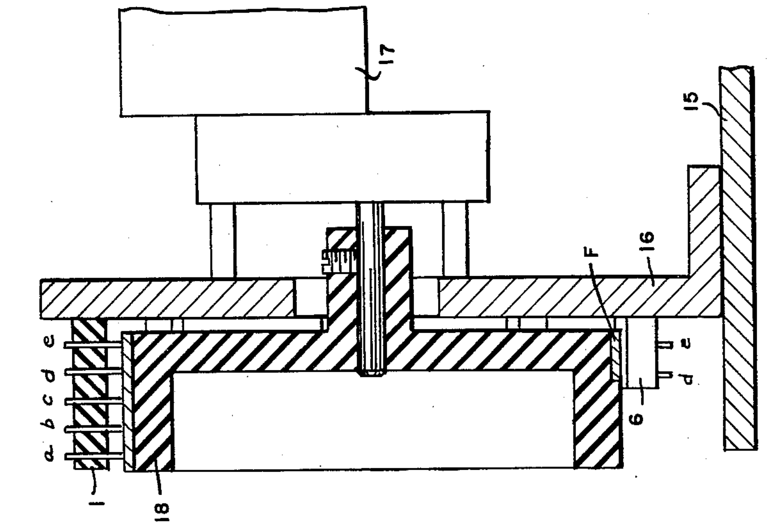
Figure 1A:
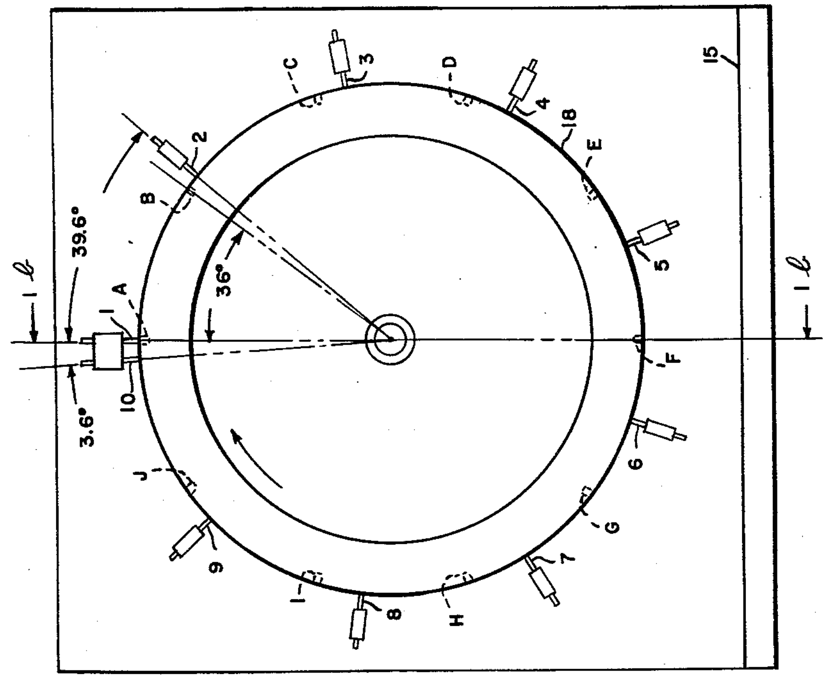

Referring to FIGS. 1*a* and 1*b*, the rotating vernier contactor comprises a base 15 on which is mounted a standard 16 that in turn supports a constant speed motor 17 to the shaft of which is attached the rotating member 18 of the contactor. The rotor 18, which may be made of a suitable insulating material such as a molded phenolic resin, has a plurality of equally spaced transverse contact bars embedded in and flush with its surface. In the specific example shown, there are 10 such bars identified as A–J. An equal number of brush groups, numbered 1–10, are also provided. These groups are supported by suitable holders attached to standard 16, the brushes being of any suitable design capable of making good electrical contact with bars A–J as they pass beneath. The brush groups, except for 10 and 1, are equally spaced by an angular distance equal to $$\frac{360°}{N}+\frac{360°}{N^2}$$

where N is the number of rotor contact bars, starting with group 1 and proceeding in the direction of rotation of rotor 18. When properly laid out, the angular distance between group 10 and group 1 will be the incremental distance $360°/N^2$. In the example shown the spacing is 39.6° with the distance between group 10 and group 1 equal to 3.6°.

Brush group 1 has five brushes in positions *a, b, c, d* and *e* as shown in FIG. 1*b*. The remaining groups 2–10 need have only two brushes in positions *d* and *e*, as shown for group 6 in FIG. 1*b*. Contact bars A–J have different transverse lengths. Contact bar A has sufficient length to contact all five brushes, contact bars C, E, G and I contact only brushes *c, d* and *e*, contact bars B, D, H and J contact only the two brushes *d* and *e*, and contact bar F contacts only brushes *b, d* and *e*. The arrangement of the contact bars and their lengths relative to the brush groups are shown in the plane development of the rotor contact surface and brush group positions of FIG. 2.

Figure 2:
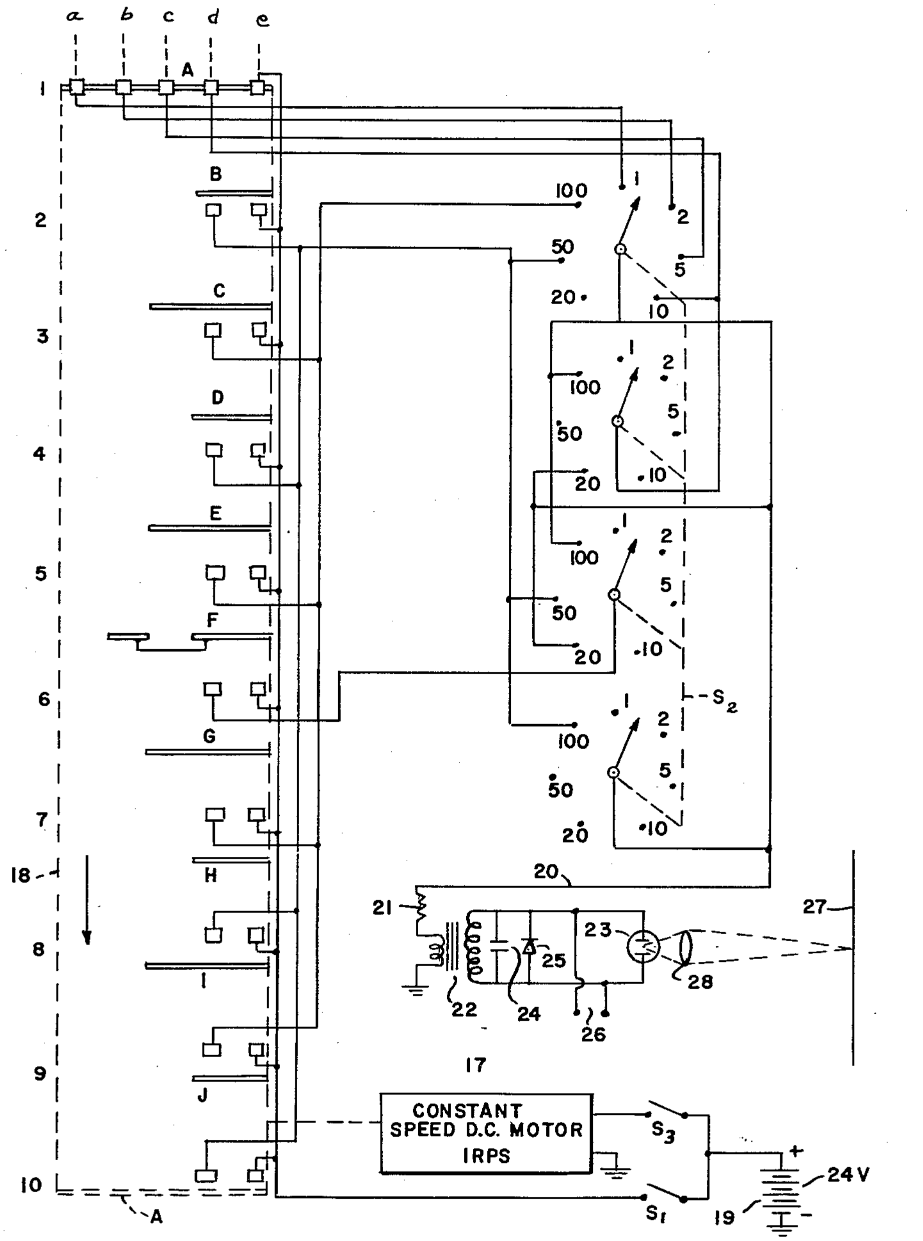
FIG. 2 is a schematic diagram of the vernier contactor and associated frequency switching and pulse amplifying circuits.

Referring to FIG. 2 when $S_1$ is closed the positive terminal of direct current source 19 is connected to the "*e*" brushes of all brush groups. Therefore when each contact bar passes beneath a brush group it connects the "*e*" brush to and thereby energizes one or more of the "*a*," "*b*," "*c*" and "*d*" brushes. A four-bank frequency selecting switch $S_2$ connects the "*a*," "*b*," "*c*" and "*d*" brushes to conductor 20 in accordance with a predetermined pattern designed to give the frequencies indicated at the various switch positions. These frequencies are given in cycles per second and are based on a motor 17 speed of one revolution per second.

The frequencies that may be obtained from a contactor of the above described type may be found by evaluating the following expressions:

$$F=XS \quad (1)$$

$$F=\frac{N^2}{X}S \quad (2)$$

where $N$=number of rotor contacts=number brush positions
$X$=any factor of N
$S$=rotor speed in revolutions/second
$F$=frequency in cycles/second For the specific example illustrated, $N$=10 and $S$=1, and since the factors of 10 are 1, 2, 5 and 10, the following frequencies are indicated by the above expressions:

| X | F(1) | F(2) |
|---|---|---|
| 1 | 1 | 100 |
| 2 | 2 | 50 |
| 5 | 5 | 20 |
| 10 | 10 | 10 |

These frequencies may be obtained by appropriate connections to the various brushes as shown in FIG. 2.

The number of positions required in switch $S_2$ is also determined by the factors of N. The number of positions required for the frequencies produced by the "*d*" brushes in cooperation with all ten of contact bars A–J equals the number of factors of N, in this case four, namely, the 10, 20, 50 and 100 c./s. positions. The number of additional positions required to accommodate the remaining frequencies produced by one of the other brushes and one or more but not all of the rotor contacts is one less than the number of factors of N. Therefore the total number of positions required is $2L-1$, where L is the number of factors of N. The number of brushes required at position 1, in addition to the common "*e*" brush, is equal to L, making $L-1$ additional brushes at this position. The number of rotor contacts cooperating with any one of the additional brushes is $N/Y$, where Y is any factor of N other than 1. The number of consecutive rotor contacts occurring prior to any rotor contact cooperating with one of the additional brushes at position 1 in producing a frequency always equals $Y-1$, using the appropriate factor. Also, for the frequencies generated by one or more "*d*" brushes cooperating with all rotor contacts, the number of consecutive unused brush positions passed by any rotor contact prior to passing a used position is $X-1$, using the factor corresponding to the frequency.

Referring to FIG. 2 for analysis of a specific example, when $S_3$ is closed the motor 17 drives rotor 18 in the direction of the arrow at a constant speed of 1 r.p.s. With $S_2$ in the 1 c./s. position only the "*a*" brush of group 1 is connected to a conductor 20. Since only bar A is capable of contacting this brush, line 20 is energized only once for each revolution of rotor 18. As a result, a rectangular wave, of the form shown at (*a*) in FIG. 3, having a frequency of 1 c./s. appears on conductor 20. With $S_2$ in the 2 c./s. position, only brush "*b*" of group 1 is connected to conductor 20. Since only contact bars A and F are capable of contacting this brush the rectangular wave produced in conductor 20 has a frequency of 2 c./s. With $S_2$ in the 5 c./s. position only brush "*c*" of group 1 is connected to conductor 20. Since five contact bars, namely A, C, E, G and I are capable of contacting this brush the frequency of the resulting wave is 5 c./s. With $S_2$ in the 10 c./s. position, only the "*d*" brush of group 1 is connected to conductor 20 and, since all ten contact bars are capable of contacting this brush, the frequency of the resulting rectangular wave is 10 c./s.

For generating the 20 c./s. frequency the "*d*" brushes of groups 1 and 6 are connected to conductor 20. The ten contact bars contact these brushes a total of twenty times per revolution to produce a frequency of 20 c./s. The contacting sequence is A1, F6, J1, E6, I1, D6, etc. For generating the 50 c./s. frequency the "*d*" brushes of groups 2, 4, 6, 8 and 10 are connected to conductor 20. The contacting sequence is A10, B2, D4, F6, H8, J10, A2, C4, E6, G8, I10, J2, etc., there being 50 contacts made for each revolution of rotor 18 for a frequency of 50 c./s. Finally, for the 100 c./s. frequency, the "*d*" brushes of all groups are connected to conductor 20 so that 100 energizations of this conductor occur for each revolution of rotor 18 producing a rectangular wave of 100 c./s. The contacting sequence in this case is: A1, B2, C3, D4, E5, F6, G7, H8, I9, J10, J1, A2, B3, C4, D5, E6, F7, G8, H9, I10, I1, J2, A3, etc.

The rectangular low voltage wave on conductor 20 is applied through current limiting resistor 21 to the primary winding of step-up transformer 22. This transformer has a turns ratio high enough to give a secondary voltage exceeding the firing potential of gaseous discharge device 23. For neon and argon lamps the firing potention lies in the range 70–100 volts. The secondary winding is tuned to a frequency above the highest pulse frequency, for example, 1500 c./s. by condenser 24. Unidirectional device 25 shunts the secondary for the purpose of damping oscillations in the secondary circuit after the first half cycle to prevent multiple firings of lamp 23.

Figure 3:
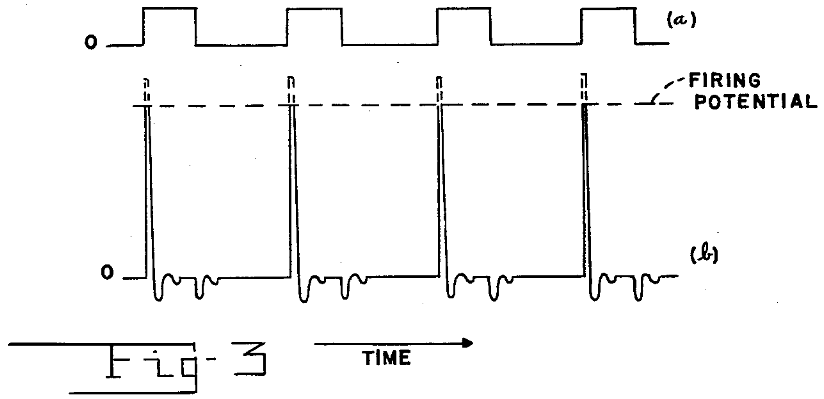
FIG. 3 shows waveforms obtained in the pulse generator circuit.

The rectangular wave applied to the primary of transformer 22 is illustrated at (*a*) in FIG. 3. The leading edge of each pulse in this wave initiates a sharp rise in the voltage across the secondary winding which shock excites the tuned secondary circuit into oscillation at 1500 c.p.s. The diode 25 is poled so as to be nonconductive on the first half-cycle of this oscillation so that the secondary voltage rises to the firing potential of gaseous discharge device 23. The firing of the discharge device clips the secondary voltage at firing level. At the completion of the first half-cycle the secondary voltage reverses polarity and diode 25 becomes conductive. This heavily damps the second half cycle of secondary voltage and prevents this half-cycle, or subsequent half-cycles if any, from exceeding the firing potential of device 23. Therefore only one firing of the discharge device occurs for each leading edge of the rectangular wave on conductor 20. The waveform across the secondary of transformer 22, available at output terminals 26, is shown at (*b*) in FIG. 3.

Because of the relatively high frequency to which the secondary of transformer 22 is tuned, the half-cycle of voltage that fires gaseous discharge device 23 is of short duration so that a single short pulse of light is produced at each firing. This, as previously stated, may be used to place equal time interval markings on photographic film. For this purpose the light may be focused onto the film 27 by a suitable lens 28. Since the firing voltage is always of the same polarity the glow in lamp 23 is always produced at the same electrode so that the light source is small and physically stable.

Figure 4:
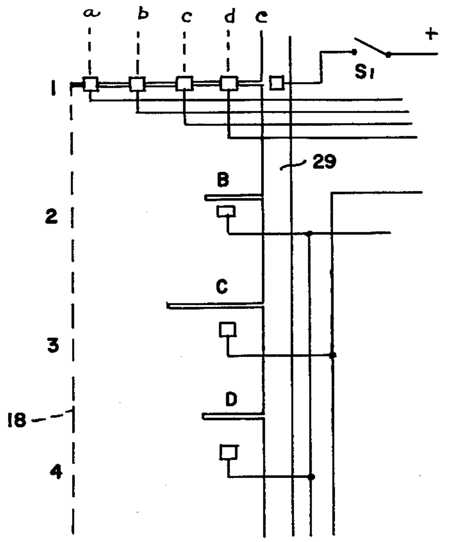
FIG. 4 shows a modification of the contactor.

FIG. 4 shows a modification of the rotor 18 that eliminates the need for more than one "*e*" brush. This is accomplished by placing a slip ring 29, electrically connected to all of the transverse contact bars, beneath the "*e*" brush position. The slip ring may be energized from a single "*e*" brush.

We claim:

1. A variable frequency generator of sharp relatively high voltage pulses comprising: a relatively low voltage source of direct current: a step-up transformer; a variable frequency periodic switching device connected between said source and the primary of said transformer; and a condenser, a unidirectional device, a gaseous discharge device and an output circuit all connected in shunt to said secondary winding, said condenser tuning said secondary winding to resonate at a frequency higher than the highest frequency of said switching device, said unidirectional device being poled to be nonconductive during the first half-cycle of the resonant wave in said secondary winding following each closure of said switching device and said gaseous discharge device having a firing potential greater than the voltage of said source but less than the maximum voltage generated across said secondary winding.

2. A variable frequency generator of short duration light pulses comprising: a source of relatively low voltage direct current; a gaseous discharge lamp having a firing potential exceeding the voltage of said source; a step-up transformer; a variable frequency periodic switching means connected between said source and the primary of said transformer for applying a variable frequency rectangular wave to said primary; a condenser and a unidirectional device; means connecting said lamp, said unidirectional device and said condenser in shunt to said secondary, the capacity of said condenser being such as to tune said secondary to resonate at a frequency higher than the highest frequency of said switching device, said unidirectional device being poled to be nonconductive during the first half-cycle of the resonant wave in said secondary winding following each closure of said switching means and the turns ratio of said transformer being such that the maximum voltage across its secondary exceeds the firing potential of said lamp.

References Cited in the file of this patent

UNITED STATES PATENTS

| | | |
|---|---|---|
| 1,854,274 | Prinz | Apr. 19, 1932 |
| 2,310,092 | Knowles | Feb. 2, 1943 |
| 2,840,763 | Rambo et al. | June 24, 1958 |

FOREIGN PATENTS

| | | |
|---|---|---|
| 38,580 | France (Addition to No. 611,427) | Mar. 24, 1931 |
| 963,086 | Germany | May 2, 1957 |